|   | United States Patent [19] | [11] | 3,954,930 |
|---|---|---|---|
|   | Vasilos et al. | [45] | May 4, 1976 |

[54] CUTTING TOOL BLANK

[75] Inventors: Thomas Vasilos, Winthrop; William H. Rhodes, Lexington; John E. Niesse, Andover, all of Mass.

[73] Assignee: Avco Corporation, Cincinnati, Ohio

[22] Filed: Oct. 9, 1970

[21] Appl. No.: 79,676

[52] U.S. Cl. .............................. 264/65; 51/309 R; 264/60; 264/102; 264/332
[51] Int. Cl.² ........................................... B24D 3/06
[58] Field of Search ............ 264/65, 125, 332, 102; 106/65; 51/309

[56] References Cited
UNITED STATES PATENTS

| 3,093,498 | 6/1963 | Whittemore, Jr. et al. ............ 106/65 |
| 3,377,176 | 4/1968 | Wolkodoff et al. .................. 264/332 |

OTHER PUBLICATIONS

R. C. Rossi et al., "Final Stage Densification in Vacuum Hot-Pressing of Alumina", Nov., 1965, Jour. Amer. Cer. Soc., pp. 558–564.

A. G. King, "Ceramics For Cutting Metals", May, 1961, Ceramic Bulletin, pp. 395–401.

E. J. Smoke et al., "Hydrogen and Vacuum Firing", Apr., 1965, Ceramic Age, pp. 103 and 104.

*Primary Examiner*—Jeffery R. Thurlow
*Attorney, Agent, or Firm*—Charles M. Hogan; Abraham Ogman

[57] ABSTRACT

The present invention is directed to an improved cutting tool blank formed by hot pressing a mixture of finely divided high-purity alumina and from about 0.05% to 0.35% of magnesia. Up to 0.10% nickel oxide may be present. The hot pressing temperatures are effected at a temperature in the range of about 1300°C to 1525°C so that the crystal size of the alumina in the tool blank has an average size range from 1 to 2 microns and the pressed blank has a final product density in excess of 3.97 grams per cubic centimeter. The preferred density of the blank is in excess of 3.98 grams per cubic centimeter. The hot pressing is conducted under vacuum conditions.

3 Claims, No Drawings

CUTTING TOOL BLANK

The present invention relates to a cutting tool blank formed from high purity alumina and to the procedure for forming the cutting tool blank.

The art has appreciated that ceramics, and in particular hot pressed alumina articles, are hard and wear resistant. Moreover, formed alumina is sufficiently hard and wear resistant for usage as metal cutting tools. Indeed, alumina is superior in some respects to tungsten carbide, even diamond tools because alumina is oxidation resistant. Alumina cutting tools can be used under circumstances where diamonds and tungsten carbide burn up. Advantageously, the source material, i.e., high purity alumina powder, is readily available and comparatively inexpensive. The desirable properties of alumina cutting tools have long since drawn the attention of workers skilled in the art thereto as witness the teachings in U.S. Pat. No. 3,093,498, for example.

The object of the present invention is to provide a superior molded alumina tool blank.

A further object of the invention is to provide an improved process for forming a superior molded alumina tool blank.

The superiority of cutting tools formed from the present alumina tool blank appears intimately related to both process and product parameters. The superiority can be attributed, in part at least, to careful control of crystal size and of porosity in the blank, two product characteristics which result from operation of the blank forming procedure within closely controlled operational parameters.

Briefly stated, the process of the present invention involves vacuum hot pressing a mixture of high purity alumina and from 0.05% to 0.35% by weight of magnesia. The particle size of the alumina-magnesia mixture should not exceed about 0.5 microns. The hot pressing is effected in a temperature range of about 1300°–1525°C with conventional hot pressing equipment and conventional pressure conditions. The applied pressure may, for example, be in the range of about 1000 psi to 5000 psi. Important to the process is that care is taken during the heating and pressing cycle to achieve a controlled crystal growth. The average crystal size of the molded alumina tool blank is within the range of 1 to 2 microns. The fabricating temperature of the blank should not exceed about 1525°C; otherwise excessive crystal growth occurs.

The magnesia content of 0.05 – 0.35% is present specifically to control crystal development during processing. A preferred magnesia content is within the range of 0.1 – 0.25%. The presence of magnesia together with careful temperature control of the hot pressing cycle provides the desired average crystal size range in the formed cutting tool blank of from 1 to 2 microns. Additives other than magnesia, discussed above, and nickel oxide, discussed later on, do not appear necessary. The presence of other additives may be detrimental to the cutting properties of the ultimate tool. Pure alumina seems to form the highest quality tools.

The formed tool blank has a density in excess of 3.97 grams per cc and preferably in excess of 3.98 grams per cc. The latter figure is very close to the intrinsic density of alumina, i.e., 3.986 grams per cc.

As has been indicated, the starting material for practice of the present invention is high purity alumina and high purity magnesia of a particle size not exceeding about 0.5 microns in diameter. Such finely divided alumina of high purity, e.g., less than 300 ppm cation impurities, is available commercially. Therefore, techniques for preparation of pure alumina powder in the proper particle size range does not form part of the present invention. The same may be said about high purity magnesia of a particle size not exceeding about 0.5 microns in diameter, such being available commercially.

In practice, it has been found that the tool blank and ultimately the tools formed according to this invention are not uniform in color, being varying shades of grey, batch to batch. Color variations sometimes appear in the same tool. Whatever may cause the color differences has no effect on the performance of the tools. Unfortunately, some customers associate uniform optical appearance with product quality. To allay customer fears about off-color tools, and color variation on a tool, the tool blank may be tinted black by including up to 0.10% nickel oxide, preferably 0.03–0.10% as an additive during the formation thereof. The nickel oxide is included in partial substitution of the magnesia. Nickel oxide acts much like magnesia to control crystal development in the formed alumina tool blank. Here, however, the nickel oxide has a special advantage, cosmetic in nature. Its presence converts the tool blank into a black article and no noticeable optical differences show up batch to batch. An essentially uniform black tool blank can always be provided. Importantly, presence of the nickel oxide has not been found to have any effect on the quality of the ultimate cutting tool.

The hot pressing procedure as well as the composition must be closely controlled to achieve the desired average crystal size in the final tool blank of 1–2 microns. In particular, the hot pressing temperature is limited so that the maximum temperature attained by the blank should not exceed 1525°C. At higher temperatures, the crystal growth rate increases and crystal size begins to exceed the 2 micron level which is believed to be optimum for highest quality products. The heating time and applied pressure levels are not different from that known to the art. Accordingly, the firing cycle sequences heretofore employed by the art may be employed, altered only in that the temperature of the blank is not permitted to exceed about 1525°C. It should be appreciated that the details of optimum pressing pressures and of optimum thermal cycle may have to be determined by trial and error for any given installation in order for the hot pressed alumina tool blank to have the desired average crystal size of 1–2 microns.

A significant process feature of the present invention is conducting the hot pressing operation under evacuated conditions. Specifically contemplated is evacuation of the hot pressing chamber to relatively high vacuum, e.g., the vacuum attainable by commercial diffusion pumps which may be as low as 0.1 micron of gas pressure. Comparative specimens, i.e., vacuum hot pressing versus hot pressing in open-to-ambient equipment shows that hot pressing under evacuated conditions does not affect either crystal size or the degree of densification. No difference between comparable specimens can be seen under a microscope. Yet, tools formed from specimens hot pressed in an evacuated chamber are, in fact, superior to tools made from non-evacuated hot pressed specimens. The exact reasons are not known, but it is theorized that the greater wear rate of tools made from the blanks formed under ambient conditions are attributable to presence of gases trapped inside the hot pressed blank. In the course of a hot pressing cycle operated under evacuated conditions, out-gassing occurs during the heating and pressing cycle. The gas pressure rises temporarily from about 1–10 microns up to as high as 100 microns during the heating cycle. It is believed that the superior properties are in part attributable to better crystal growth control and improved inter-crystalline control under evacuated conditions. Product density is high, being in excess of 3.97 grams per cc, preferably exceeding 3.980 grams per cc. Hot pressing under evacuated conditions seems to facilitate attainment of high product density and of substantial freedom from the presence of entrapped gases.

For further understanding of the invention, the following specific examples are presented:

EXAMPLE I

Powdered high purity alumina and magnesia (both less than 0.5 micron) are mixed thoroughly, the magnesia content being 0.25% by weight. A portion of the mixture then had 0.10% by weight nickel oxide added thereto.

Tool blanks (right discs about 6 inch diameter, 0.2 inch thick) were formed from each mixture in an evacuated hot press electric furnace. During each run, the applied pressure was 4000 psi and the heating cycle was 3 hours from ambient to 1470°C. Then a 3-½ hour hold at 1470°C still at 4000 psi after which the pressure was released and the furnace cooled to ambient (six hours) before breaking the vacuum. The internal pressure was held to about 10 microns during the heating cycle.

The tool blanks containing nickel oxide were black, a uniform shade of black. The other specimens were various shades of grey, with some of the blanks being non-uniform in color.

Three tools of geometry SNG 434 were cut from blanks for comparison with like tools formed under non-evacuated hot pressing conditions. Both sets of tools were employed to cut steel of Rockwell C-40 hardness (Carpenter Stentor Tool Steel) to a depth of 0.050 in. using an in-feed rate of about 0.004 in. A turning rate of 850–1200 surface feet per minute was employed with the actual rate being varied over this range in a random fashion during each test.

The best vacuum pressed tool cut through 15.8 miles of metal. In the air pressed tools, the best tool failed at 10.9 miles of metal cut.

Tools from the nickel oxide containing blanks and tools from blanks containing magnesia only, proved out to be of the same high quality.

EXAMPLE II

The same equipment and heating cycle was employed to form blanks of various compositions with and without use of vacuum. Test specimens were prepared (e.g., rectangular pieces 0.1 × 0.2 × 1.75 inches).

Four-point transverse bend strength tests were conducted on various grades of hot pressed aluminum oxide. These tests were conducted at 23°C in an ambient atmosphere and a specimen geometry where the moment arm to half-height ratio was at least eight and no greater than ten. The specimen width to height ratio was 2.0 for some tests and 2.5 for others. The above test conditions meet the criteria for precise bent beam mechanical testing. Strength values should not be affected by the slight differences in testing geometry.

Test results are as follows:

| Type of Material | Density % Theo. | Grain Size Microns | Strength Kpsi |
|---|---|---|---|
| Ambient pressed 100% Al$_2$O$_3$ | 99.0 | 1–2 | 66.0± 4.0 |
| Vacuum pressed 100% Al$_2$O$_3$ | 99.9 | 1.5 | 72.9±12.0 |
| Vacuum pressed 99.75% Al$_2$O$_3$ 0.25% MgO | 99.7 | 1.0 | 73.7±10. |
| Ambient pressed 100% Al$_2$O$_3$ | 99.9 | 10–15 | 48.0± 3.0 |
| Ambient pressed 99.65% Al$_2$O$_3$ 0.25% MgO - 0.10% NiO | 99.8 | 1–2 | 61.4±10 |

These results indicate that vacuum hot pressed aluminum oxide is stronger than ambient hot pressed aluminum oxide and that presence of 0.25% MgO does not affect the strength. Further, increased grain size (over the 1–2 micron grain size) results in a marked reduction of strength. Finally, the addition of 0.25% MgO + 0.10% NiO does not affect strength (just as was the case for the MgO addition alone). In both cases, the strength values for the doped samples were similar to those for the 100% aluminum oxide samples within their category of manufacture (ambient or vacuum hot pressed). The standard deviations indicate that the strength values overlap in several of the categories. Statistical tests for "probability of significance" indicate that the probability is high for the differences and similarities cited above to be statistically significant.

What is claimed is:

1. A process for fabricating a cutting tool from alumina which comprises hot pressing a mixture of powdered alumina, magnesia and optionally nickel oxide, the powders having a diameter of 0.5 microns or less the magnesia content being from 0.05% to 0.35% by weight of the whole, the nickel oxide content being from 0 to 0.10% by weight of the whole, and, where present, being in equal weight substitution for magnesia, and hot pressing being effected at temperatures in the range of about 1300°C to 1525°C, said mixture further being maintained under evacuated conditions of less than 100 microns during the hot pressing cycle until an average crystal size of 1 to 2 microns is produced and cooling said pressed mixture.

2. The process of claim 1 wherein the magnesia content is from 0.10 – 0.25%.

3. The process of claim 1 wherein the magnesia content is from 0.10 – 0.25% and the nickel oxide content is from 0.03 – 0.07%.

* * * * *